W. H. KEMPER.
TRACTION CHAIN.
APPLICATION FILED OCT. 6, 1919.
1,360,115.
Patented Nov. 23, 1920.
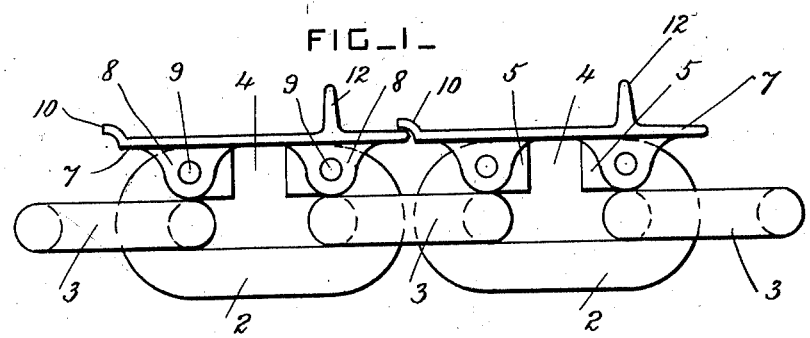
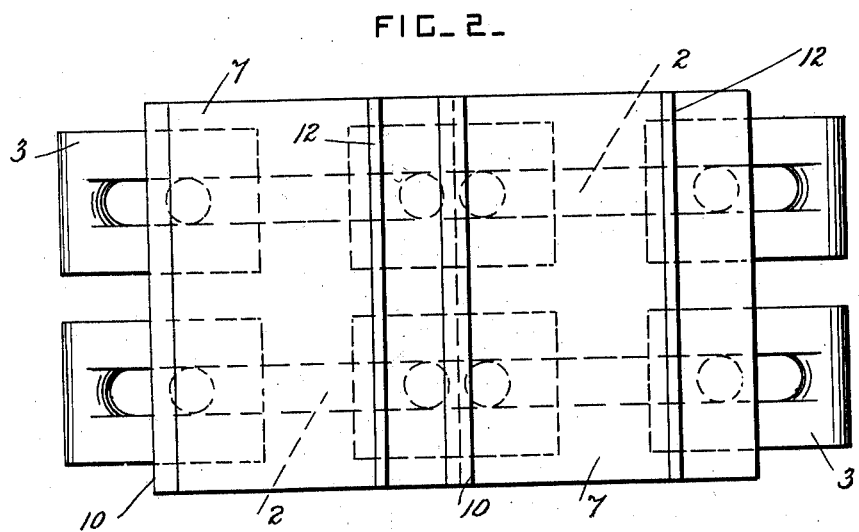
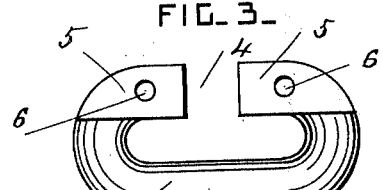
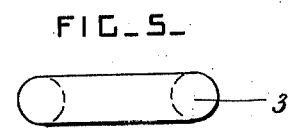
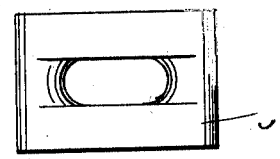
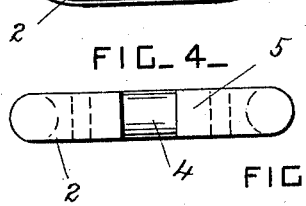
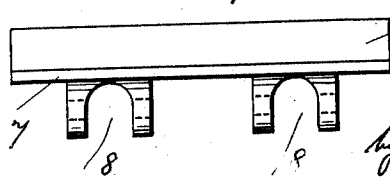
Inventor
William H. Kemper
by Herbert W. Jenner
Attorney.

UNITED STATES PATENT OFFICE.

WILLIAM H. KEMPER, OF MONTGOMERY, ALABAMA.

TRACTION-CHAIN.

1,360,115.

Specification of Letters Patent.

Patented Nov. 23, 1920.

Application filed October 6, 1919. Serial No. 328,836.

*To all whom it may concern:*

Be it known that I, WILLIAM H. KEMPER, a citizen of the United States, residing at Montgomery, in the county of Montgomery and State of Alabama, have invented certain new and useful Improvements in Traction-Chains, of which the following is a specification.

This invention relates to endless traction chains for use on caterpillar tractors or tanks; and it consists in the novel construction and combination of the parts hereinafter fully described and claimed.

In the drawings, Figure 1 is a side view of a portion of a traction chain constructed according to this invention. Fig. 2 is a plan view of the same. Fig. 3 is a detail side view, and Fig. 4 is a plan view, of one of the vertical links. Fig. 5 is a detail side view, and Fig. 6 is a plan view, of one of the horizontal links. Fig. 7 is an end view of one of the tread plates.

Two similar endless chains are preferably provided, and are arranged parallel to each other, and are supported and driven by any approved wheels or rollers. Each chain is formed of vertical links 2 and horizontal links 3 arranged alternately and pivoted together. The horizontal links are preferably rectangular plates in outline. The vertical links have gaps 4 on one side to admit the end portions of the links 3, so that all the links of the chain can easily be taken apart and replaced. The portions 5 of the link on each side of its gap are preferably rectangular in cross-section, and have holes 6 formed crosswise through them.

The tread plates 7 are made wide enough to overlap the two parallel chains, and each tread plate has two pairs of double-eyes 8 on its underside. The double-eyes 8 are removably connected to the part 5 of the link by pins 9, so that the tread plates extend across the gaps of the links. The main longitudinal portions of the links 2 have no perforations or bolt holes which would weaken them.

Each tread plate preferably has a curved lip 10 at one end which is articulated with the adjacent end of the next tread plate, and each tread plate has one or more projections or grousers 12 projecting from its upper surface and adapted to engage with the ground. A traction chain constructed in this manner is inexpensive to make and repair, and is very efficient in action.

What I claim is:

1. In a traction chain, a series of links each of which has a gap in one of its side portions, a series of connecting links arranged between the links of the first series, and tread plates having double-eyes on their undersides which are removably secured to the side portions of the links at the ends of the said gaps by transversely arranged pins.

2. In a traction chain, two similar chains, each chain having a series of links each of which has a gap in one of its side portions, a series of connecting links arranged between the links of the first series in each said chain, and tread plates common to both chains and having double-eyes on their undersides which are removably secured to the side portions of the links at the ends of the said gaps by transversely arranged pins.

In testimony whereof I have affixed my signature.

WILLIAM H. KEMPER.